United States Patent [19]

Igashira et al.

[11] Patent Number: 4,550,744

[45] Date of Patent: Nov. 5, 1985

[54] PIEZOELECTRIC HYDRAULIC CONTROL VALVE

[75] Inventors: Toshihiko Igashira, Toyokawa; Yasuyuki Sakakibara, Nishio; Toru Yoshinaga; Seiko Abe, both of Okazaki; Kazuhide Watanabe, Toyohashi, all of Japan

[73] Assignee: Nippon Soken, Inc., Nishio, Japan

[21] Appl. No.: 551,693

[22] Filed: Nov. 14, 1983

[30] Foreign Application Priority Data

Nov. 16, 1982 [JP] Japan .................................. 57-199706
Nov. 30, 1982 [JP] Japan .................................. 57-210793

[51] Int. Cl.$^4$ ............................................. F16K 17/38
[52] U.S. Cl. ................................. 137/80; 137/614.11; 137/614.19; 123/447; 251/282; 251/129.01
[58] Field of Search ............... 123/446, 447; 137/468, 137/79, 80, 614.11, 614.19; 251/129, 282

[56] References Cited

U.S. PATENT DOCUMENTS

| | | | |
|---|---|---|---|
| 3,055,631 | 9/1962 | Kippenhan | 251/129 |
| 3,501,099 | 3/1970 | Benson | 123/472 |
| 3,873,063 | 3/1975 | Illing | 251/282 |
| 3,943,901 | 3/1976 | Takahashi et al. | 123/447 |
| 3,961,612 | 6/1976 | Okamoto et al. | 123/446 |
| 4,019,481 | 4/1977 | Lakra | 123/447 |
| 4,176,822 | 12/1979 | Chadwick | 251/129 |
| 4,280,464 | 7/1981 | Kanai et al. | 123/447 |
| 4,284,263 | 8/1981 | Newcomb | 137/468 |
| 4,381,750 | 5/1983 | Funada | 123/446 |
| 4,388,908 | 6/1983 | Babitzka et al. | 123/446 |

Primary Examiner—A. Michael Chambers
Attorney, Agent, or Firm—Cushman, Darby & Cushman

[57] ABSTRACT

A hydraulic control valve having a piezoelectric actuator comprises an expansible sleeve loosely received within a bore of the valve housing, with one end thereof being fixedly or stationarily mounted relative to the housing and the other end thereof being expansibly mounted within the bore. A slidable first piston is mounted within the bore of the valve housing and is urged against the other end of the expansible sleeve. This first piston floatingly supports one end of the piezoelectric actuator, the other end of which is supported by a second piston which is slidably mounted within the sleeve and is coupled to a valve member operable to cooperate with a valve seat to open and close an inside fuel passage communicating an inlet port with an outlet port. The linear expansion of the sleeve due to a change in the ambient temperature causes the first piston to displace in one direction together with the piezoelectric actuator supported thereby so that the linear expansion of the piezoelectric actuator occurring in the opposite direction due to a similar ambient temperature change is counterbalanced whereby the second piston, serving as an output member of the piezoelectric actuator, is maintained at a constant distance with respect to the valve member regardless of change in the ambient temperature. Such a temperature compensation structure enabling precise positioning of the second piston ensures improved injection timing and injection quantity control of a fuel injection system for an internal combustion engine.

24 Claims, 5 Drawing Figures

PIEZOELECTRIC HYDRAULIC CONTROL VALVE

BACKGROUND OF THE INVENTION (1) Field of the Invention

This invention relates generally to fuel injection systems for internal combustion engines and, more particularly, to electronically-operated piezoelectric control valves making use of a piezoelectric effect for regulating injection timing and quantity of fuel.

(2) Description of the Prior Art

It is well known in the art that electric control of fuel injection systems enables flexible regulation of injection timing and quantity in accordance with various engine parameters. In this regard, the application of a piezoelectric effect to injection control valves has been proven to provide a most desirable response to electrical injection pulses because piezoelectric elements undergo piezoelectric deformation almost instantaneously when subjected to an electric field. Known piezoelectric control valves for controlling internal combustion engine fuel injection systems generally comprise a column of piezoelectric discs coupled to a shut-off valve member. A piezoelectric control valve is placed between a source of high-pressure fuel and an injector of the differential pressure type to on/off control the flow of fuel flowing into the injector. However, the amount of piezoelectric deformation of the piezoelectric elements available for displacement of the shut-off valve member is very small, for example, on the order of a fraction of a millimeter, so that even the slightest longitudinal expansion or contraction of the valve housing and piezoelectric elements due to a variation in the ambient temperature would hinder proper performance of the control valve.

Moreover, conventional piezoelectric hydraulic control valves are designed merely to on/off control the flow of fuel. This means that although a rapid pressure build-up is obtained at the injector upon energization of a valve, the pressure, once it is built-up in the fuel supply line between the valve and the injector nozzle, remains the same even after the valve is de-energized. The fuel pressure prevailing at the injection nozzle hinders precise control of the injection period and, hence, quantity control.

The above-mentioned impossibility of obtaining a pressure collapse becomes critical in fuel injection systems having a servomultiplier wherein the outlet port of a piezoelectric control valve is connected to a pilot-operated spool valve which is driven by a pilot pressure signal from the piezoelectric control valve to operate the servomultiplier, which multiplies the supply pressure to feed ultra high-pressure fuel to the injectors. In this instance, if the pressure of the pilot signal applied from the piezoelectric control valve to a pilot port of the spool valve remains the same when the driving pulse is terminated, the spool valve cannot perform a cyclic movement.

SUMMARY OF THE INVENTION

The primary object of the present invention is to provide a temperature compensation construction for a piezoelectric hydraulic control valve which is capable of assuring stable performance regardless of a variation in the ambient temperature.

Another object of the invention is to provide a piezoelectric hydraulic control valve capable of developing a rapid pressure collapse on de-energization while also enjoying the advantage of a rapid pressure build-up, as in the prior art piezoelectric control valves.

A further object of the invention is to provide a piezoelectric hydraulic control valve having provisions for accelerating pressure build-up and collapse.

This invention provides a piezoelectric hydraulic control valve comprising a housing having an axially-extending, closed-ended central bore and having an inlet port for receiving pressurized fluid and an outlet port for delivering the pressurized fluid and a fluid passage communicating the inlet and the outlet port; a valve seat in the housing and extending across the fluid passage; a movable valve member cooperating with the valve seat; a column of piezoelectric material received coaxially within the bore of the housing and having an upper and a lower end; means for applying a voltage to the piezoelectric column to induce axial expansion of the column; connecting means providing between the lower end of the column and the valve member for transmitting the axial expansion of the column to the valve member to open and close the fluid passage; a thermally expansible sleeve received within the bore of the housing and having an upper and a lower end, the lower end of the sleeve being fixedly supported by the housing but the other portions thereof being loosely fitted within the bore of the housing to permit the upper end of the sleeve to displace axially as the sleeve thermally expands due to a variation in the ambient temperature; and movable supporting means received movably within the bore of the housing and attached to the upper end of the sleeve for supporting the upper end of the piezoelectric column.

With this arrangement, the upper end of the sleeve undergoes displacement in accordance with the thermal expansion or contraction, in one direction, of the sleeve as the ambient temperature varies. This displacement accompanies displacement of the movable supporting means, which, in turn, causes an equal amount of displacement of the upper end of the piezoelectric column. Ambient temperature variation also results in the expansion or contraction of the piezoelectric column itself. However, this causes displacement of the lower end of the column in the opposite direction. Thus, the expansion or contraction of the piezoelectric column in one direction is compensated for by the expansion or contraction of the sleeve in the opposite direction so that the relative position of the lower end of the column with respect to the valve member is kept constant regardless of ambient temperature variation. Further, as the piezoelectric column is supported somewhat floatingly by the supporting means movable within the housing bore, the thermal expansion and contraction of the housing does not affect the position of the piezoelectric column.

In the preferred embodiments of the invention, the expansible sleeve has the same axial length as that of the piezoelectric column. Preferably, the sleeve is made from a material having the same coefficient of linear expansion and the same modulus of longitudinal elasticity as those of the piezoelectric column. To this end, the sleeve may be made from a piezoelectric ceramic material, such as lead zirconate titanate (PZT), forming the piezoelectric column.

In another preferred embodiment of the invention, the movable supporting means comprises a piston received fluid-tightly and slidably within the bore of the housing, the piston defining a hydraulic pressurizing chamber in the bore. The pressurizing chamber is communicated, via a second fluid passage in the housing, with the first-mentioned fluid passage for transmitting the pressurized fluid into the pressurizing chamber to bias the piston against the sleeve and the piezoelectric column.

Preferably, the connecting means comprises a second hydraulic piston received fluid-tightly and slidably within the sleeve and defining a second hydraulic pressurizing chamber in the bore of the housing opposite the first-mentioned hydraulic pressurizing chamber. This second hydraulic pressurizing chamber is communicated, via a third fluid passage, with the first-mentioned fluid passage to transmit the pressurizing fluid into the second hydraulic pressurizing chamber in order to bias the second hydraulic piston against the piezoelectric column in a direction opposite to the directin of action of the first piston.

With this arrangement, the longitudinal elastic deformation which the sleeve undergoes due to the downwardly directed thrust stress applied thereto by the first piston under the action of the hydraulic pressure in the first pressurizing chamber is counterbalanced by the longitudinal elastic deformation which the piezoelectric column undergoes due to the upwardly directed thrust stress applied thereto by the second piston under the action of the hydraulic pressure in the second pressurizing chamber. This enables the removal of the influence of hydraulic pressure fluctuation that would be present in the first hydraulic pressurizing chamber so that the lower end of the piezoelectric column is maintained at a constant position with respect to the valve member irrespective of fluid pressure fluctuation.

In a case where a second hydraulic piston is provided, the transversal cross-sectional areas of the piezoelectric column, the second hydraulic piston, the sleeve, and the first hydraulic piston may have a relationship expressed by the equation $$S_2/S_1 = (S_4 - S_2)/S_3$$

wherein $S_1$ is the transversal cross-sectional area of the piezoelectric column, $S_2$ is the transversal cross-sectional area of the second hydralic piston, $S_3$ is the transversal cross-sectional area of the sleeve, and $S_4$ is the transversal cross-sectional area of the first hydraulic piston.

With this arrangement, the thrust stress acting per unit cross-sectional area of the sleeve becomes equal to the thrust stress per unit cross-sectional area of the piezoelectric column so that both the sleeve and the piezoelectric column undergo exactly the same amount of longitudinal elastic deformation but in opposite directions. This ensures extremely precise positioning of the lower end of the piezoelectric column relative to the valve member.

In still another embodiment, the piezoelectric hydraulic control valve further comprises relief means for relieving the pressurized fluid in the first fluid passage downstream of the valve member at a relief rate which is less than the flow rate of the incoming fluid flowing into the inlet port of the housing.

This relief means serves to develop a rapid pressure collapse at the outlet port as soon as the valve member shuts off the fluid passage, yet assuring a substantial pressure rise at the outlet port when the fluid passage is opened. The feature of a rapid pressure collapse enables more precise injection timing and quantity control and also enables the use of a piezoelectric hydraulic control valve in a fuel injection system in combination with a servomultiplier.

In another preferred embodiment, the connecting means comprises a pumping piston which is fluid-tightly and slidably received within the expansible sleeve and defines a pumping chamber in the central bore of the housing, the pumping chamber forming part of the fluid passage at the side of the pumping piston opposite the piezoelectric column. As the piezoelectric column is activated and deactivated, the pumping piston displaces in response to the piezoelectric deformation of the column to pressurize and de-pressurize the fluid in the pumping chamber to accelerate pressure build-up and collapse at the outlet port.

These and other features of the invention, as well as the advantages thereof, will become apparent when reading the following description in conjuction with the accompanying drawings.

BRIEF DESCRIPTION OF THE DRAWINGS

Throughout several views, like reference numerals designate like parts and members.

DESCRIPTION OF THE PREFERRED EMBODIMENTS

Figure 1:
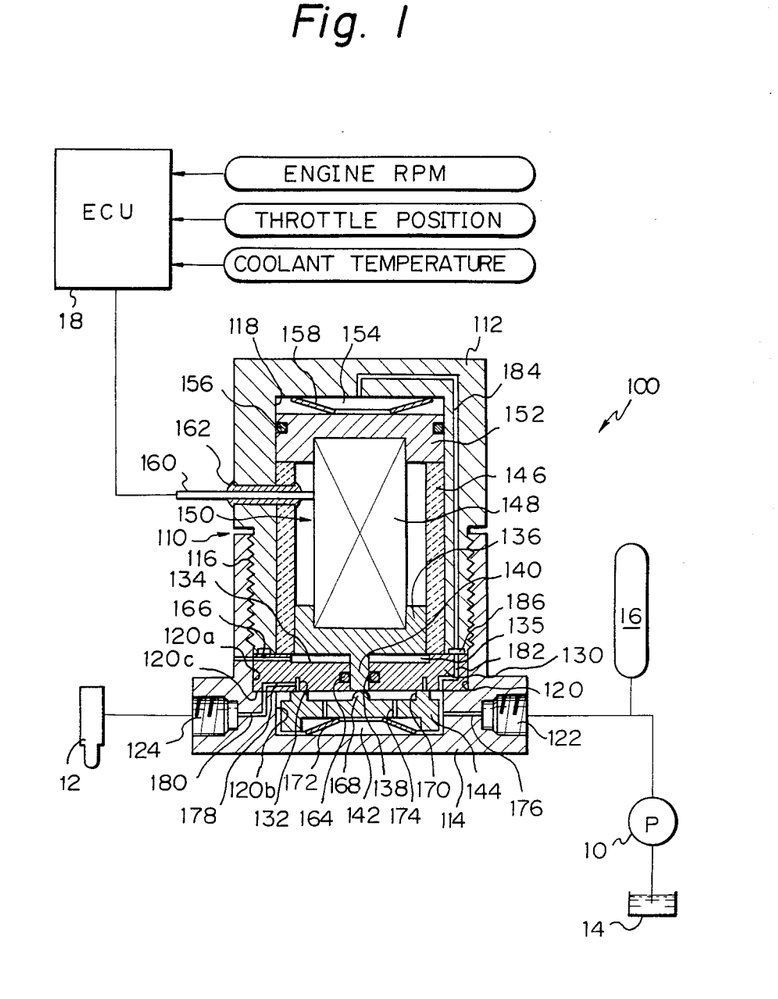
FIG. 1 is an elevational view in cross section of a piezoelectric hydraulic control valve according to the first embodiment of the invention, illustrating the control valve as employed in a fuel injection system of an internal combustion engine.

Referring to the drawings, FIG. 1 schematically depicts a fuel injection system employing a piezoelectric hydraulic control valve 100 according to the invention. The valve 100 is connected between a high-pressure pump 10 and an injector 12 of the conventional differential pressure type so as to on/off control cyclically the connection between them to regulate the injection timing and quantity of the injector 12. The pump 10 is adapted to draw fuel from a fuel reservoir 14, pressurize it at a high pressure of, for example, 200 kg/cm², and feed it to the valve 100 through an accumulator 16. The injector 12, which is operable at 150 kg/cm², is mounted on an internal combustion engine (not shown) so as to inject fuel directly into a combustion chamber or into a precombustion chamber of the engine. Although only one control valve and one injector are shown, it should be noted that a set of identical control valves and a set of identical injectors may be empolyed in the fuel injection system, with each injetor being operatively mounted for each cylinder of the engine. The valve 100 is operated by an electronic control unit (ECU) 18 which calculates the optimum injection timing and quantity in accordance with various engine parameters, such as engine rpm, throttle valve position, coolant temperature, and the like, and issues electric control pulse to the valve 100.

The valve 100 comprises a generally cylindrical housing 110 consisting of an upper housing member 112 and a lower housing member 114 which are threadingly connected to each other at 116. The upper housing member 112 has an axially-extending central bore 118 closed at the top thereof. The lower housing member 114 has a stepped bore 120 coaxial with the bore 118 and closed at the bottom thereof. The stepped bore 120 comprises a bore portion 120a having a larger diameter than the bore 118, a bore portion 120b having a diameter roughly identical with the bore 118, and an intermediate shoulder portion 120c interconnecting the bore portions 120a and 120b. The lower housing member 114 is provided with an internally threaded inlet port 122 for connection with the pump 10 to receive pressurized fuel therefrom and an internally threaded outlet port 124 for connectin with the injector 13 to deliver the pressurized fuel thereto.

A generally disc-shaped rigid valve seat 130 is closely fitted within the bore portion 120a and is urged by the lower end of the upper housing 112 against the shoulder portion 120c to snugly rest thereon. The valve seat 130 is made of a heat-treated steel disc and is defined by an upper and a lower surface which are polished along parallel planes. The valve seat 130 may be either interference-fitted within the bore portion 120a or held in position therein by a lock pin (not shown) so that it does not turn with respect to the lower housing member 114. The valve seat 130 is provided at the lower surface thereof with an annular groove 132 coaxial with the longitudinal axis of the valve 100, the function of the groove 132 being described later. The valve seat 130 is provided at the upper surface thereof with a central recess 134 which has a diameter slightly larger than the outer diameter of a piston 136, described later, and serves to define a space 135 for permitting piston displacement. The valve seat 130 is further provided with a central through-aperture 138 for passing therethrough a downwardly extending projection 140 of the piston 136. The lower surface of the valve seat 130 cooperates with the smaller bore portion 120b to define a valve chamber 142 for receiving a valve member 144, described later.

An expansible sleeve 146 is received within the bore 118 of the upper housing member 112. The sleeve 146 has a diameter slightly smaller than that of the bore 118 and is loosely fitted within the bore 118 so that it freely undergoes longitudinal expansion and contraction in response to any change in the ambient temperature. It should be noted that the sleeve 146 has a length equal to that of a column 148 of piezoelectric discs of a piezoelectric actuator 150. Another important feature of the sleeve 146 is that it is made of the same material as the piezoelectric column 148 or of a material having at least the same coefficient of linear expansion as that of the piezoelectric column 148. The sleeve 146 is seated on the valve seat 130.

Above the expansible sleeve 146, the bore 118 of the upper housing member 112 slidably receives a hydraulic pressurizing piston 152 serving as a support structure for the piezoelectric column 148 and defining a hydraulic pressurizing chamber 154 within the bore 118. A sealing member, such as an O-ring 156, is mounted in a peripheral groove of the piston 152 to prevent the release of fuel from the pressurizing chamber 154. A Belleville washer 158 placed between the piston 152 and the upper housing member 112 urges the piston 152 against the sleeve 146, causing the latter to snugly rest upon the valve seat 130. However, the biasing force of the washer 158 is negligible compared with the force applied to the piston 152 by the hydraulic pressure in the pressurizing chamber 154. The piston 152 is urged against the upper end of the sleeve 146 under the action of the hydraulic pressure in the chamber 154 and the spring force of the washer 158, but it slides up and down along the bore 118 as the sleeve 146 expands or contracts longitudinally in response to a change in the ambient temperature. In this manner, the piston 152 serves as a floating support structure for the piezoelectric column 148.

The piezoelectric actuator 150 comprises the piezoelectric column 148 made from a piezoelectric material such as PZT. The column 148 comprises a stack of discs provided with conventional interleaved foil electrodes (not shown) connected to an outer load 160. The column 148 consists, for example, of one hundred piezoelectric discs, each disc being adapted to exhibit a longitudinal piezoelectric expansion of one micrometer when subjected to a voltage of 500 volts. The column 148 is supported at the upper end thereof by the hydraulic pressurizing piston 152 and at the lower end thereof by the piston 136. To provide precise centering of the column with respect to the longitudinal axis of the valve 100, the upper end of the column 148 is fitted within a central cylindrical recess formed on the lower surface of the upper piston 152, with the lower end thereof being fitted within a similar recess formed on the upper surface of the lower piston 136. The outer lead 160 of the piezoelectric actuator 150 extends to the outside of the valve upper housing member 112 through an elastomeric insulator 162 mounted in coaxial radial through-openings formed in the upper housing member 112 and the sleeve 146. The elastomeric insulator 162 permits a certain amount of longitudinal displacement of the upper part of the sleeve 146 with respect to the upper housing member 112 due to thermal expansion and contraction.

The lower piston 136 is loosely fitted within the sleeve 146 so as to slide in a longitudinal direction as the piezoelectric column 148 undergoes piezoelectric deformation. The lower piston 136 serves as a means for transmitting the longitudinal piezoelectric deformation of the column 148 to the valve member 144. To this end, the piston 136 is provided at the lower surface thereof, with the cylindrical central projection 140 extending through the through-aperture 138 in the valve seat 130 to contact the valve member 144. A sealing member, such as an O-ring 164, is fitted into an annular groove formed in the through-aperture 138 to prevent the fuel in the valve chamber 142 from leaking through the clearance between the valve seat 130 and the projection 140. The lower piston 136 is designed and constructed so that, in the inoperative position of the actuator 150, the lower surface of the piston 136 is flush with the lower end surface of the sleeve 146 and the lower end surface of the projection 140 is flush with the lower surface of the valve seat 130, as shown in FIG. 1. The space or clearance 135 defined by the recess 134 in the valve seat 130 is communicated with the outside of the valve 100 by an air-bleed passage 166 so as to permit pulsation of the space 135 as the piston 136 displaces.

The valve member 144 received in the valve chamber 142 is adapted to be moved by the piston projection 140 to open and close the annular groove 132 in the valve seat 130. The valve member 144 has a generally disc-like configuration and is provided at the upper end thereof with a rounded central projection 168 and a surrounding coaxial annular projection 170 facing the annular groove 132 in the valve seat 130. The valve member 144 is made from steel and is heat-treated to improve the wear resistivity. The flat upper end surface of the annular projection 170 is specularly polished so that it snugly engages the valve seat 130. It should be noted that the rounded end of the central projection 168 and the flat end surface of the annular projection 170 of the valve member 144 lie in a common plane so that, at the inoperative position of the piezoelectric actuator 150, the annular projection 170 abuts against the valve seat 130 under the action of a Belleville washer 172 to close the groove 132. Although not shown in the drawing, a plurality of longitudinally-extending, spaced guide ribs may be provided on the wall of the bore portion 120b, with a small clearance with respect to the circumferential periphery of the valve member 144, so that the valve member 144 is guided longitudinally therealong as it is displaced within the valve chamber 142. The valve member 144 has a plurality of longitudinal through-holes 174 designed to communicate the valve chamber portions located beneath and above the valve member 144 with each other.

The lower housing member 114 is provided with a passage 176 communicating the inlet port 122 with the valve chamber 142 to transmit the pressurized fuel into the valve chamber 142. Also, passage 178 and 180 are formed, respectively, in the valve seat 130 and the lower housing member 114 to transmit the pressurized fuel in the annular groove 132 into the outlet port 124. The passage 176, the valve chamber 142, the annular groove 132, and the passages 178 and 180 together serve to form a fuel passage which communicates the inlet port 122 with the outlet port 124 and which is opened and closed by the valve member 144 cooperating with the valve seat 130.

Passages 182 and 184 are provided in the valve seat 130 and in the upper housing member 112, respectively, so as to transmit the pressurized fuel in the valve chamber 142 into the hydraulic pressurizing chamber 154 to pressurize the hydraulic pressurizing piston 152 against the sleeve 146 and the piezoelectric column 148. The lower end surface of the upper housing member 112 is recessed to form an annular groove 186 communicated with the passages 182 and 184. The annular groove 186 serves to connect the passages 182 and 184 with each other irrespective of the angular position of the upper housing member 112 when screwed into the lower housing member 114.

The operation of the piezoelectric hydraulic control valve 100 of FIG. 1 is as follows.

The fuel pressurized by the pump 10 and regulated by the accumulator 16 roughly at a pressure of 200 kg/cm² is fed through the inlet port 122 and the passage 176 into the valve chamber 142. The fuel pressure in the valve chamber 142 is reflected via the passages 182 and 184 in the hydraulic pressurizing chamber 154 to pressurize the piston 152 downwardly against the expansible sleeve 146. This causes the sleeve 146 to be tightly held in position between the piston 152 and the valve seat 130. The upper end of the piezoelectric column 148 is rigidly supported by the hydraulic pressurizing piston 152 while the lower end thereof is expansibly supported by the slidable piston 136, which is urged upwardly by the fuel pressure in the valve chamber 142 acting on the projection 140 and by the valve member 144 under the action of the Belleville washer 172. As the pistion 136 is so designed and dimensioned that the lower end surface of the projection 140 is flush with the lower surface of the valve seat 130 and because the upper flat end surface of the annular projection 170 and the top of the rounded projection 168 of the valve member 144 are coplanar, the annular projection 170 is brought into contact with the valve seat 130 under the action of the washer 172 as well as the action of the fuel pressure which acts over the cross-sectional area of the annular groove 132 to break the communication between the valve chamber 142 and the outlet port 124.

Upon energization of the piezoelectric actuator 150, the piezoelectric column 148 exhibits longitudinal piezoelectric deformation, causing the piston 136 to move downwardly against the action of the fuel pressure in the valve chamber 142 and the action of the washer 172 to lift the valve member 144 off of the valve seat 130 to open the annular groove 132. Thus, the pressurized fuel in the valve chamber 142 is transmitted through the passage 178 and 180 and the outlet port 124 into the injector 12 to permit fuel injection into the engine cylinder.

The piezoelectric hydraulic control valve 100 is subjected to a variation in the ambient temperature during the operation thereof. In this event, the expansible sleeve 146 cooperates with the hydraulic pressurizing piston 152 to accomplish temperature compensation of the valve. As the temperature increases, the sleeve 146 undergoes thermal expansion. Since the sleeve 146 is received loosely in the upper housing member 112, with the lower end thereof stationarily abutting against the valve seat 130 and the upper end thereof in pressure contact with the slidable piston 152, the thermal expansion of the sleeve 146 causes the upper end thereof to displace longitudinally upwardly, this in turn causing the piston 152 to displace upwardly for a distance coresponding to the amount of linear expansion of the sleeve 146. An increase in the ambient temperature also results in thermal expansion of the piezoelectric column 148. However, as the column 148 is rigidly supported at the upper end thereof by the piston 152, the column 148 tends to expand in a downward direction, causing the lower piston 136 to displace downwardly. However, as the upper end of the column 148 is supported by the upper piston 152, previously displaced in an upward direction due to expansion of the sleeve 146, the downwardly-directed expansion of the column 148 is counterbalanced by the upwardly-directed expansion of the sleeve 146 so that the expansion of the column 148 has substantially no effect on the position of the lower end of the column 148 and, hence, of the lower piston 136. Since the sleeve 146 is made of the same material as that of the piezoelectric column or at least of a material having the same coefficient of linear expansion as that of the column 148 and since the sleeve 146 has the same length as that of the column 148, the amount of thermal expansion of the sleeve 146 is equal to that of the column 148. Thus, even the smallest amount of expansion of the column 148 is precisely compensated for by an equal amount of expansion of the sleeve 146. A similar effect is obtained when there is a decrease in the ambient temperature that results in the thermal contraction of the column 148. In this manner, the present invention provides a temperature compensation structure which is capable of precisely maintaining the lower end of the column 148 and the lower piston 136 at a predetermined relative position with respect to the valve member 144 and the valve seat 130. This enables the piezoelectric hydraulic control valve 100 to operate with a performance which is more stable than that of the prior control valves, regardless of the variation in the ambient temperature.

Figure 2:
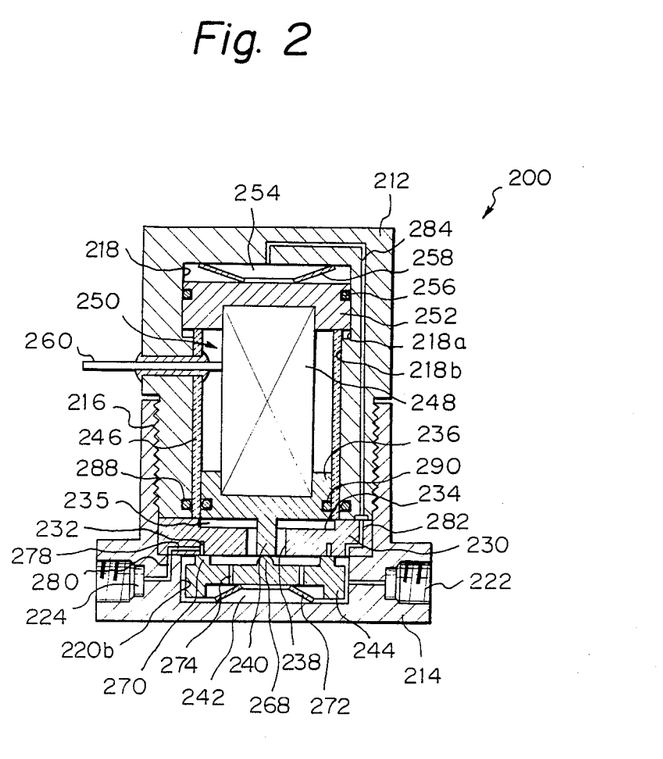
FIG. 2 is an elevational view in cross section of a second embodiment of the invention.

Referring to FIG. 2, there is shown a second embodiment 200 of the invention. An upper housing member 212 is screwed into a lower housing member 214 as in the first embodiment. The upper housing member 212 has a stepped bore 218 comprising a larger bore portion 218a which slidably and liquid-tightly receives a first or upper hydraulic piston 252 and a smaller bore portion 218b in which an expansible sleeve 246 is loosely received. The sleeve 246 has the same axial length as that of a piezoelectric column 248 of a piezoelectric actuator 250 and is made of a material having the same coefficient of linear expansion as that of the column 248, as in the first embodiment. In this embodiment, the material forming the sleeve 246 has, furthermore, the same modulus of longitudinal elasticity as that of the column 248 for the reasons set forth below. To this end, the sleeve 246 may be made from PZT forming the column 248.

The column 248 is supported at the upper end thereof by the first or upper piston 252 and at the lower end thereof by a second or lower hydraulic piston 236, which is slidably and liquid-tightly received in the sleeve 246.

A valve seat 230 is provided with a central bore 238 having a diameter larger than the outer diameter of a downwardly-extending cylindrical central projection 240 of the second or lower piston 236 so as to transmit the fuel pressure in a valve chamber 242 into a space 235 defined between the lower surface of the second piston 236 and a recess 234 of the valve seat 230. The space 235 provides the piston 36 with a space for travelling during piezoelectric deformation of the column 248 and also serves as a second or lower hydraulic chamber for constantly pressurizing the piston 236 in an upward direction. To prevent the fuel under pressure in the second hydraulic chamber 235 from leaking through clearances between the upper housing member 212 and the sleeve 246 and between the sleeve 246 and the second piston 236, sealing members such as O-rings 288 and 290 are mounted on both sides of the sleeve 246.

According to the important feature of this embodiment, the transversal cross-sectional areas of the column 248, the second piston 236, the sleeve 246, and first piston 252 are so selected that they have a correlation expressed by the following equation $$S_2/S_1 = (S_4 - S_2)/S_3 \qquad (1)$$

wherein $S_1$ is the transversal cross-sectional area of the column 248, $S_2$ is the transversal cross-sectional area of the second piston 236, $S_3$ is the transversal cross-sectional area of the sleeve 246, and $S_4$ is the transversal cross-sectional area of the first piston 252. To this end, the outer diameter of the column 248 may be about 20 mm, the outer diameter of the second piston 236 may be about 28 mm or less, the inner diameter of the sleeve 246 may be about 28 mm, the outer diameter of the sleeve 246 may be about 32.3 mm, and the outer diameter of the first piston 252 may be about 36 mm.

Other constituent parts and members of the piezoelectric hydraulic control valve 200 are substantially the same as those of the first embodiment 100 and are designated by like reference numerals. Obviously, however, the air-bleed passage 166 is not necessary in this embodiment.

The operation of the piezoelectric control valve 200 is as follows. When the piezoelectric actuator 250 is de-energized, the fuel passage between the inlet port 222 and the outlet port 224 is shut off so that no substantial fuel pressure is established at the outlet port 224 while the valve chamber 242 is subjected to a supply pressure. Assuming the supply pressure at the inlet port 222 to be P, the fuel under pressure in the upper or first pressurizing chamber 254 exerts a downwardly-directed hydraulic force $p \cdot S_4$ on the first or upper piston 252 while the fuel in the lower or second pressurizing chamber 235 exerts an upwardly-directed hydraulic force $p \cdot S_2$ on the second or lower piston 236. The longitudinal stress $\sigma_1$ applied to the piezoelectric column 248 per unit transversal cross-sectional area thereof is $\sigma_1 = P \cdot S_2/S_1$. The longitudinal stress $\sigma_2$ applied to the sleeve 246 per unit transversal cross-sectional area thereof is $\sigma_2 = (P \cdot S_4 - P \cdot S_2)/S_3$. From the above equation (1), it follows that $\sigma_1 = \sigma_2$. This means that both the column 248 and the sleeve 246 undergo an equal amount of strain or elastic deformation due to hydraulic pressure because the length of and the modulus of the longitudinal elasticity of the sleeve 246 and the column 248 are identical. This enables location of the lower end of the column 248 and, hence, the lower end of the downward projection 240 of the second piston 236 at a predetermined relative position with respect to the valve seat 230 and the valve member 244 regardless of any variation or fluctuation in the supply pressure. Thus, the structure and arrangement of the second embodiment enables the removal of even the slightest influence of hydraulic pressure fluctuation that would otherwise be exerted on the sleeve of the first embodiment and ensures extremely precise operation of the control valve 200.

The manner of temperature compensation of the valve 200 is the same as in the first embodiment and therefore is not described here. Upon energization of the piezoelectric actuator 250, the column 248 exhibits piezoelectric deformation or expansion so as to displace the lower piston 236 downwardly. The piston 236 is subjected to a force $P(S_4 - S_2)$ which causes the valve member 244 to move away from its associated valve seat 230, thereby transmitting the fuel pressure at the inlet port 222 into the outlet port 224 to allow fuel injection.

Figure 3:
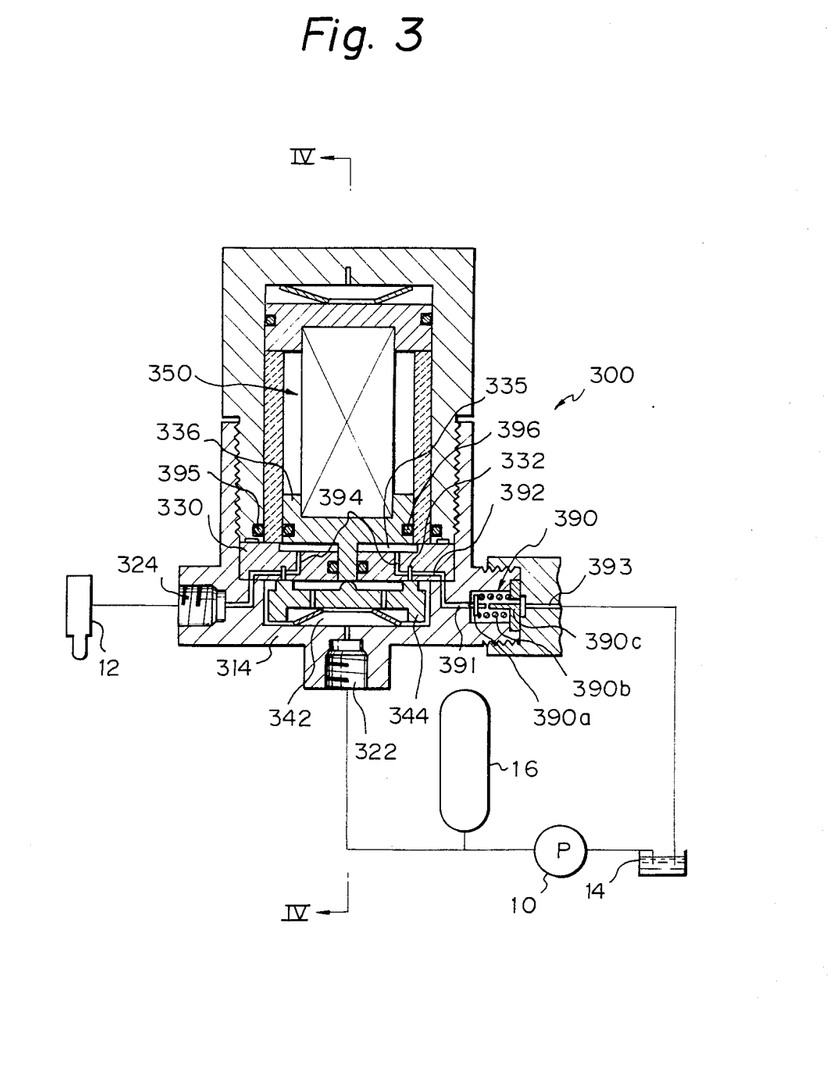
FIG. 3 is an elevational view in cross section of a third embodiment of the invention as employed in a fuel injection system.
Figure 4:
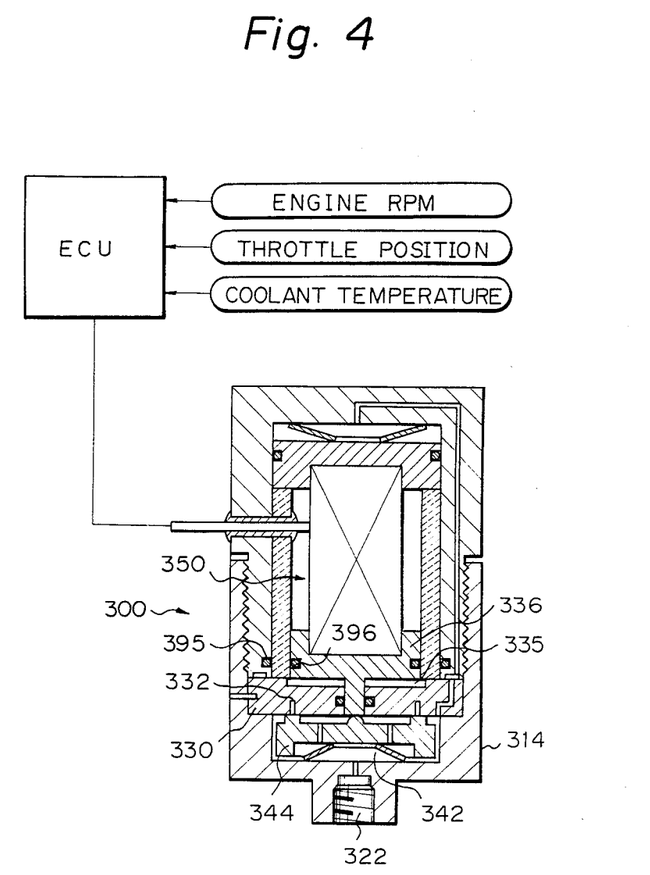
FIG. 4 is a cross-sectional view taken along the line IV—IV of FIG. 3.

FIGS. 3 and 4 illustrate a piezoelectric hydraulic control valve 300 according to the third embodiment of the invention. This embodiment basically differs from the first embodiment of FIG. 1 in that it is provided with a pressure relief valve 390 and in that the second or lower piston 336 serves as a pumping piston to pressurize and de-pressurize the fuel in the space 335, which, in this embodiment, also serves as a pumping chamber. The inlet of the relief valve 390 is connected to the annular groove 332 in the valve seat 330 via a passage 391 in the lower housing member 314 and via a passage 392 in the valve seat 330 so as to receive fuel from the annular groove 332. The outlet of the relief valve 390 is connected to the fuel reservoir 14 by a drain passage 393 to return fuel thereto. The inlet port 322 of the valve 300 is provided in the bottom wall of the lower housing member 314 and is connected to the primary fuel pump 10 via the accumulator 16 regulating the fuel pressure at 200 kg/cm². The relief valve 390 includes a valve member 390a, a coil spring 390b, and a stop member 390c and is housed in the lower housing member 314. The coil spring 390b is preset so that the valve member 390a is released at a pressure of 100 kg/cm². The maximum travel of the valve member 390a is limited by the stop member 390c in such a manner that when the piezoelectric actuator 350 is energized to lift the valve member 344 off of the associated valve seat 330 to communicate the inlet port 322 with the outlet port 324, the maximum relief rate through the relief valve 390 controls the output pressure of the outlet port 324 at 190 kg/cm².

The space 335 serving as a pumping chamber is connected to the annular groove 332 via passages 394 in the valve seat 330, instead of being connected to the outside of the valve housing via the air-bleed passage 166 as in the embodiment of FIG. 1. A pair of sealing members such as O-rings 395 and 396 are provided on both sides of the sleeve 346, as in the second embodiment, to prevent fuel leakage. Other constituent parts and members of the control valve 300 are substantially the same as those of the first embodiment and therefore are not described here.

Turning to the operation of the third embodiment 300, the fuel pressure in the annular groove 332 and, hence, at the outlet port 324 is reduced to a pressure of 100 kg/cm² due to the pressure relief valve 390 when the piezoelectric actuator 350 is de-energized so that there is no fuel injection through the injector 12. As the actuator 350 is energized, the fuel in the valve chamber 342 having a pressure of 200 kg/cm² is transmitted into the annular groove 332 of the valve seat 330. The fuel in the annular groove 332 is in part released through the relief valve 390. However, as the travel of the valve member 390a is limited by the stop member 390c, a pressure of 190 kg/cm² is still built up at the outlet port 324. This fuel pressure is sufficient for fuel injection since the injector 12 is set to operate at a pressure of 150 kg/cm². Due to the presence of the stop member 390c, the maximum relief rate through the relief valve 390 is limited so that a substantial part of the fuel is distributed to the injector 12 for injection. When the actuator 350 is de-energized, the pressure in the annular groove 332 is rapidly decreased due to the relief valve 390 relieving the pressure as soon as the valve member 344 closes the annular groove 332. This rapid pressure collapse in the annular groove 332 is reflected in the injector 12 so that fuel injection is terminated substantially instantaneously upon de-energization of the piezoelectric actuator 350. This enables precise control of the injection period and, hence, of the injection quantity.

During the foregoing operation, the space or pumping chamber 335 performs a specific function in conjunction with the lower or pumping piston 336. As the actuator 350 is energized, the lower piston 336 makes a downward stroke to pressurize the fuel in the pumping chamber 335 and displace it through the passages 394 toward the annular groove 332 to produce a rapid pressure build-up therein. It is considered that this pressure build-up occurs almost concurrent with the energization of the actuator 350 and is followed almost instantly by a pressure build-up resulting from the lifting of the valve member 344. Thus, the pumping piston 336, together with the pumping chamber 335, serves to reduce the pressure rise time and to accelerate the pressure build-up at the injector 12. As the piezoelectric actuator 360 is de-energized, the piston 336 retracts upwardly to draw the fuel in the annular groove 332 into the pumping chamber 335 so that the pressure collapse due to the relief valve 390 is further accelerated. This acceleration of pressure build-up and pressure collapse enables precise control of injection timing and quantity.

The manner of temperature compensation of the control valve 300 is substantially the same as that in the first embodiment and therefore is not described here.

Figure 5:
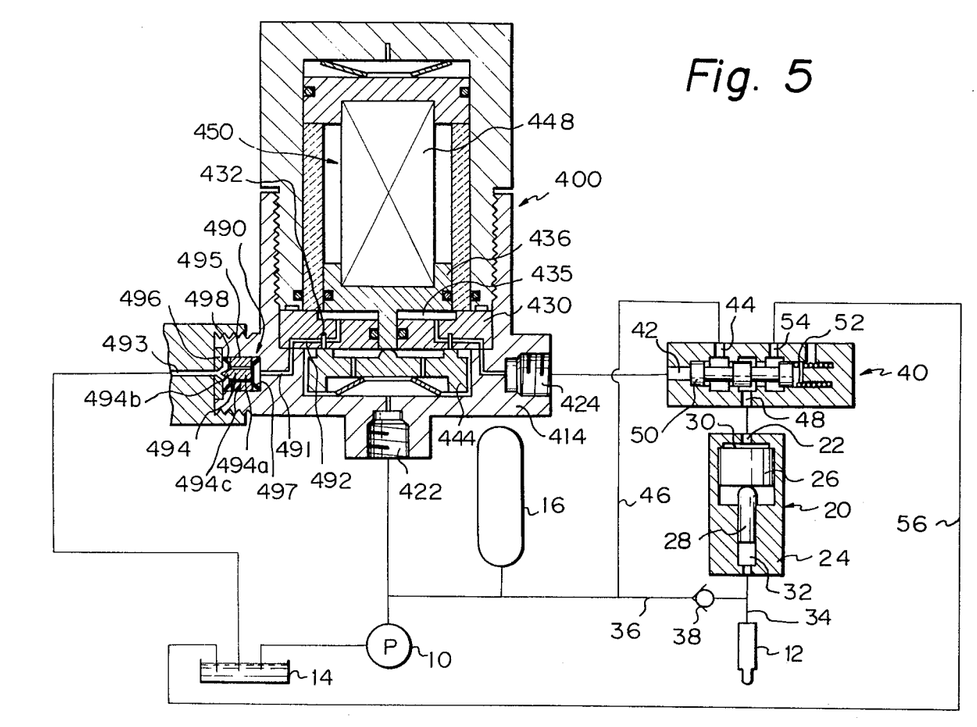
FIG. 5 is an elevational view in cross section of a fourth embodiment of the invention, illustrating the control valve as combined into a fuel injection system having a spool valve-operated servomultiplier.

Referring to FIG. 5, there is shown a piezoelectric hydraulic control valve 400 according to the fourth embodiment of the invention. The valve 400 is combined into a fuel injection system having a servomultiplier 20 controlled by a pilot-operated spool valve 40. The control valve 400 differs from the third embodiment of FIGS. 3 and 4 only in the construction of the relief valve 490. As in the third embodiment, the relief valve 490 is connected to the annular groove 432 in the valve seat 430 via passages 491 and 492 and to the fuel reservoir 14 via a return passage 493. The relief valve 490 comprises a valve member 494 slidably mounted in a bore 495 formed in the lower housing member 414. The valve member 494 includes a cylindrical main body 494a and a conical head 494b cooperating with a valve seat 496. The valve main body 494a has a plurality of narrow passages 495c therethrough. The valve member 494 is biased toward the valve seat 496 by a Belleville washer 497 and is biased away from the valve seat 496 by a Belleville washer 498. The spring constant of the Belleville washers 497 and 498 is so selected that the relief valve 490 is fully opened when the pressure at the inlet of the valve 490 is atmospheric pressure but is fully closed when that pressure is 200 kg/cm².

The inlet port 422 of the control valve 400 is connected to the primary fuel pump 10 pressurizing the fuel up to 200 kg/cm², and the outlet port 424 is connected to a pilot port 42 of the spool valve 40. The spool valve 40 has a fuel inlet port 44 connected to the accumulator 16 via a primary supply line 46. The fuel inlet port 44 is selectively connected to an outlet port or servo port 48 via a spool valve member 50 which is biased toward the left, as viewed in FIG. 5, by means of a coil spring 52. The drain port 54 of the valve 40 is connected to the fuel reservoir 14 via a drainage line 56. The spring 52 and the spool valve member 50 are so designed that the fuel inlet port 44 is connected to the outlet port 48 when the fuel pressure at the pilot port 42 exceeds 100 kg/cm² and that the outlet port 48 is connected to the drain port 54 when the fuel pressure is below 100 kg/cm².

The outlet port 48 of the spool valve 40 is communicated with an inlet port 22 of the servomultiplier 20. The servomultiplier 20 comprises a cylinder 24 having a stepped bore in which are received a primary piston 26 and a secondary plunger 28, the primary piston 26 defining a working chamber 30 and the plunger 28 defining a pumping chamber 32. The piston 26 and the plunger 28 are adapted to abut against each other. The pumping chamber 32 is connected to the injector 12 via a high-pressure line 34. A supply line 36 with a check valve 38 is provided between the primary supply line 46 and the high-pressure line 34 to feed the fuel under primary supply pressure into the pumping chamber 32. The operating pressure of the injector 12 in this injection system is set higher than the pressure of the accumulator 16, for example, at 300 kg/cm².

The operation of the fuel injection system is as follows. Upon energization of the piezoelectric actuator 450, the piezoelectric column 448 expands in a downward direction, causing the lower pumping piston 436 to displace downwardly thereby pressurizing the fuel in the pumping chamber 435 as well as lifting the valve member 444 off of the valve seat 430. This creates a rapid pressure build-up of more than 200 kg/cm² in the passage 491 so that the relief valve 490 is fully closed. The fuel pressure is transmitted through the outlet port 424 into the pilot port 42 of the spool valve 40, causing the spool valve member 50 to move to the right against the action of the spring 52 thereby connecting the inlet port 44 with the outlet port 48 so that the fuel under a pressure of 200 kg/cm² flows into the working chamber 30 of the servomultiplier 20. As a result, the primary piston 26 presses down the plunge 28, which, in turn, pressurizes the fuel in the pumping chamber 32 at an ultra-high pressure, and the fuel is injected by the injector 12 into the engine cylinder. Assuming that the supply pressure regulated by the accumulator 16 is 200 kg/cm² and that the ratio of the diameter of the plunger 28 to the diameter of the piston 26 is 3, it is possible to multiply the pressure in the pumping chamber 32 up to 1800 kg/cm².

The piezoelectric actuator 450 is de-energized after a lapse of time required for injecting a necessary quantity of fuel. As the piezoelectric column 448 contracts to its original length, the lower pumping piston 436 travels upward, allowing the valve member 444 to close the annular groove 432 and permitting the fuel downstream of the valve member 444 to be suctioned back into the pumping chamber 435, thereby producing a rapid pressure collapse in the annular groove 432. This allows the valve member 494 to move to the right under the action of the spring 498 so that the relief valve 490 initiates the release of the fuel. As a result, the fuel pressure previously applied to the pilot port 42 of the spool valve 40 rapidly diminishes or decreases to below 100 kg/cm², thereby permitting the spool valve member 50 to return to the left under the spring action and thereby disconnecting the inlet port 44 from the outlet port 48 and connecting the outlet port 48 to the drain port 54. The plunger 28 together with the primary piston 26, moves upward under the action of the fuel pressure from the accumulator 16 so that a quantity of fuel is drawn into the pumping chamber 32 for the next fuel injection. The above-mentioned cycle of operation is repeated to operate the engine.

As is apparent from the foregoing description, this embodiment is particularly suitable for providing a rapid pressure build-up and pressure collapse at the outlet port thereof. Thus, the control valve 400 may be suitably assembled into a fuel injection system of the type having a servomultiplier.

Although the present invention is described and illustrated herein with reference to the specific embodiments thereof, it should be understood that it is not limited thereby and that various modifications and changes may be made without departing from the scope of the appended claims.

We claim:

1. A piezoelectric hydraulic control valve, comprising:
   (a) a housing having an axially-extending, closed-end central bore and having an inlet port for receiving pressurized fluid and an outlet port for delivering said pressurized fluid and a fluid passage communicating said inlet and said outlet port;
   (b) a valve seat in said housing and extending across said passage;
   (c) a movable valve member cooperating with said valve seat;
   (d) a column of piezoelectric material received coaxially within said bore and having an upper and a lower end;
   (e) means for applying a voltage to said piezoelectric column to induce axial expansion of said column;
   (f) connecting means provided between said lower end of said column and said valve member for transmitting axial expansion of said column to said valve member to thereby open and close said fluid passage;
   (g) a thermal expansible sleeve received within said bore concentrically with said column, having a coefficient of linear expansion equal to that of said piezoelectric column and having an upper and a lower end, said lower end of said sleeve being fixedly supported by said housing but other portions of said sleeve being loosely fitted within said bore to permit said upper end of said sleeve to displace axially in response to thermal expansion of said sleeve due to a variation in the ambient temperature; and
   (h) movable supporting means, received movably within said bore and attached to the upper end of said sleeve, for maintaining said lower end of said column at a constant distance from said valve member regardless of ambient temperature variations by supporting said upper end of said piezoelectric column such that is displaces together with said upper end of said sleeve, whereby expansion and contraction in one direction of said sleeve compensates for the expansion and contraction, due to ambient temperature variation, in the opposite direction of said piezoelectric column, thereby maintaining said constant distance.

2. A piezoelectric hydraulic control valve according to claim 1, wherein said expansible sleeve has an axial length equal to that of said piezoelectric column.

3. A piezoelectric hydraulic control valve according to claim 1, wherein said expansible sleeve is made from the same material as that of said piezoelectric column.

4. A piezoelectric hydraulic control valve according to claim 1, wherein said housing comprises an upper and lower housing member threadingly connected to each other, said lower housing member having a stepped bore open at the top and closed at the bottom, said stepped bore including an upper large-diameter bore portion, a lower small-diameter bore portion, and a shoulder portion interconnecting said upper and said lower bore portion, said upper housing member having a bore forming said axially-extending central bore of said housing, said bore of said upper housing member having a diameter smaller than that of said upper bore portion of said lower housing member, said valve seat having a disc-like shape and being sandwiched between said shoulder portion of said lower housing member and the lower end of said upper housing member, said disc-like valve seat having a central aperture through which said connecting means extends fluid-tightly to engage with said movable valve member, said lower small-diameter bore portion in said lower housing member cooperating with the lower surface of said valve seat to define a valve chamber receiving said valve body, said valve chamber forming part of said fluid passage.

5. A piezoelectric hydraulic control valve according to claim 4, wherein said disc-like valve seat is provided at the lower surface thereof with an annular groove forming part of said fluid passage and wherein said movable valve member has a disc-like shape and is provided at the upper surface thereof with an annular projection cooperating with said annular groove to open and close said fluid passage.

6. A piezoelectric hydraulic control valve according to claim 5, wherein said disc-like valve member comprises a rounded central projection which is in point contact with said connecting means.

7. A piezoelectric hydraulic control valve according to claim 6, wherein the inner wall of said valve chamber in said lower housing member is provided with a plurality of spaced, axially-extending ribs to guide said valve member therealong.

8. A piezoelectric hydraulic control valve according to claim 1, further comprising means for relieving the pressurized fluid in said fluid passage downstream of said valve member at a relief rate which is less than the flow rate of the incoming fluid flowing into said inlet port so as to develop a rapid pressure drop at said outlet port as said valve member shuts off said fluid passage, and wherein said relieving means comprises a relief passage provided in said housing and communicating said fluid passage downstream of said valve member with the outside of said housing, and further comprises a relief valve provided in said relief passage.

9. A piezoelectric hydraulic control valve according to claim 8, wherein said relief valve is set to operate at a fluid pressure which is less than the fluid pressure at said inlet port.

10. A piezoelectric hydraulic control valve according to claim 9, wherein said relief valve comprises a relief valve member which is spring-biased toward the upstream of said relief passage to increase the relief rate as it is displaced downstream of said relief passage and stopper means to limit the maximum displacement of said relief valve member to restrict the maximum relief rate through said relief valve.

11. A piezoelectric hydraulic control valve according to claim 9, wherein said relief valve comprises a relief valve member which is spring-biased toward a neutral position thereof and which is adapted to decrease the relief rate as it is displaced downstream of said relief passage, whereby the relief rate is reduced in response to an increasing fluid pressure in said relief passage.

12. A piezoelectric hydraulic control valve according to claim 1, wherein said connecting means comprises a pumping piston received fluid-tightly and slidably within said expansible sleeve and defining a pumping chamber in said axially extending central bore of said housing at the side of said piston opposite to said piezoelectric column, said pumping chamber forming part of said fluid passage, said pumping piston being operable to be displaced in response to the piezoelectric deformation of said column as said column is activated and deactivated to pressurize and de-pressurize the fluid in said pumping chamber thereby to accelerate the pressure build-up and collapse at said outlet port.

13. A piezoelectric hydraulic control valve for controlling a high-pressure fluid, comprising:
(a) a housing having an axially extending central bore and having an inlet port for receiving a high-pressure fluid and an outlet port for delivering said fluid and a fluid passage communicating said inlet and outlet ports;
(b) a valve seat in said housing provided across said fluid passage and having an inside passage forming part of said fluid passage;
(c) a movable valve member disposed upstream of said valve seat and cooperating with said valve seat to make and break communication between said inlet and outlet ports;
(d) means for biasing said valve member against said valve seat;
(e) a piezoelectric actuator received coaxially within said bore of said housing and having one end supported by said housing and the other end displaceable in response to energization of said actuator;
(f) connecting means for transmitting the displacement of said other end of said piezoelectric actuator to said valve member;
(g) a relief passage for connecting said fluid passage downstream of said valve member to the outside of said housing; and
(h) a relief valve disposed in said relief passage for relieving the fluid in said fluid passage downstream of said valve member at a relief rate which is less than the incoming flow rate at said inlet port so that a substantial fluid pressure is built up at said outlet port as said valve member makes an open communication between said inlet and outlet ports but said fluid pressure at said outlet port is rapidly diminished due to fluid escaping through said relief passage as said valve member breaks said communication.

14. A piezoelectric hydraulic control valve according to claim 13, wherein said relief valve is adjusted to open at a fluid pressure which is less than the fluid pressure at said inlet port.

15. A piezoelectric hydraulic control valve according to claim 14, wherein said relief valve comprises a relief valve member spring-biased toward the upstream of said relief passage to increase the relief rate as said valve member is displaced downstream of said relief passage, said relief valve further comprising stopper means for limiting the maximum displacement of said relief valve member to restrict the maximum relief rate through said relief valve.

16. A piezoelectric hydraulic control valve according to claim 14, wherein said relief valve comprises a relief valve member which is spring-biased toward a neutral position thereof and which is adapted to reduce the relief rate as said valve member is displaced downstream of said relief passage under the action of fluid pressure so that the relief rate is reduced in reverse proportion to the fluid pressure in said fluid passage.

17. A piezoelectric hydraulic control valve comprising:
(a) a housing having an axially-extending, closed-ended central bore and having an inlet and an outlet port;
(b) a disc-like valve seat closely and fixedly fitted within said bore of said housing to divide said bore into an upper cavity and a lower cavity, said valve seat having at the lower surface thereof an annular groove open into said lower cavity, said valve seat having a central through-aperture;
(c) a pumping piston slidably and fluid-tightly received in said upper cavity of said bore, said pumping piston having a cylindrical central projection extending fluid-tightly through said central aperture in said valve seat;
(d) a pumping chamber defined in said upper cavity between said pumping piston and said valve seat;
(e) a disc-like valve member in contact with said central projection of said pumping piston and received movably within said lower cavity of said bore of said housing for opening and closing said annular groove in said valve seat in response to the displacement of said pumping piston;
(f) means disposed in said lower cavity of said bore for biasing said valve member into contact with said valve seat and said central projection;
(g) a first passage in said housing for transmitting pressurized fluid at said inlet port into said lower cavity;
(h) a second passage in said housing and said valve seat for transmitting pressurized fluid at said annular groove into said outlet port;
(i) a third passage in said valve seat for communicating said annular groove with said pumping chamber; and
(j) a piezoelectric actuator received coaxially within said upper cavity of said bore of said housing, said actuator being supported at the top thereof by said housing and at the bottom thereof by said pumping piston so that upon energization, said actuator expands axially causing said pumping piston to move downward to lift said valve member off of the associating valve seat against the action of said biasing means as well as to pressurize the fluid in said pumping chamber thereby accelerating the pressure rise at said outlet port, and, upon de-energization, said actuator contracts axially allowing said pumping piston to move upward under the action of said biasing means and the fluid pressure in said pumping chamber thereby allowing the valve member to close said annular groove and accelerating the collapse of fluid pressure at said outlet port.

18. A piezoelectric transducer for converting electric pulse into linear displacement, comprising:

a housing having an axially-extending central bore;
a column of piezoelectric elements received coaxially within said bore;
means for applying a voltage to said piezoelectric column to induce piezoelectric deformation of said column in response to said voltage;
output means connected to the lower end of said piezoelectric column for transmitting linear displacement due to piezoelectric deformation to the outside of said transducer;
a thermally expansible sleeve, mounted within said bore concentrically around said piezoelectric column, having a coefficient of linear expansion equal to that of said piezoelectric column with the lower end of said sleeve beign fixedly supported by said housing and with the other portions thereof being loosely fitted within said bore to permit the upper end of said sleeve to displace axially in response to thermal expansion and contraction of said sleeve due to a variation in the ambient temperature; and
movable supporting means, received movably within said bore of said housing and connected to the upper ends of said sleeve and said column, for compensating for expansion and contraction of said column due to ambient temperature variations by supporting said upper end of said column to displace conjointly with said upper end of said sleeve, whereby the expansion and contraction in one direction of said column due to ambient temperature variation compensates for the expansion and contraction in the opposite direction of said sleeve so that the relative position of said lower end of said column with respect to said housing is kept constant regardless of ambient temperature variations.

19. A piezoelectric hydraulic control valve, comprising:
(a) a housing having an axially-extending, closed-ended central bore and having an inlet port for receiving pressurized fluid and an outlet port for delivering said pressurized fluid and a fluid passage communicating said inlet and said outlet port;
(b) a valve seat in said housing and extending across said passage;
(c) a movable valve member cooperating with said valve seat;
(d) a column of piezoelectric material received coaxially within said bore and having an upper and a lower end;
(e) means for applying a voltage to said piezoelectric column to induce axial expansion of said column;
(f) connecting means provided between said lower end of said column and said valve member for transmitting axial expansion of said column to said valve member to thereby open and close said fluid passage;
(g) a thermal expansible sleeve received within said bore and having an upper and a lower end, said lower end of said sleeve being fixedly supported by said housing but other portions of said sleeve being loosely fitted within said bore to permit said upper end of said sleeve to displace axially in response to thermal expansion of said sleeve due to a variation in the ambient temperature; and
(h) movable supporting means received movably within said bore and attached to the upper end of said sleeve for supporting the upper end of said piezoelectric column in such a manner that is displaces together with the upper end of said sleeve, whereby the expansion and contraction in one direction of said sleeve compensates for the expansion and contraction, due to ambient temperature variation, in the opposite direction of said piezoelectric column so that the lower end of said column is maintained at a constant distance with respect to said valve member regardless of the temperature variation, said movable supporting means comprising a piston received fluid-tightly and slidably in said bore of said housing and defining a pressurizing chamber in said bore and wherein said housing is provided with a second fluid passage therein for transmitting the pressurized fluid in said first-mentioned fluid passage to said pressurizing chamber to pressurize said piston against said sleeve and said piezoelectric column to support said sleeve and said column together.

20. A piezoelectric hydraulic control valve according to claim 19, further comprising means for biasing said piston against said piezoelectric column.

21. A piezoelectric hydraulic control valve according to claim 20, wherein said biasing means comprises a Belleville washer disposed in said pressurizing chamber between said piston and an inner wall of said housing.

22. A piezoelectric hydraulic control valve according to claim 19, wherein said connecting means comprises a second piston received fluid-tightly and slidably within said sleeve and defining a second pressurizing chamber in said bore opposite said first-mentioned pressurizing chamber, said second pressurizing chamber being communicated with said first fluid passage via a third fluid passage to transmit the pressurized fluid into said second pressurizing chamber causing said second piston to pressurize said piezoelectric column in a direction opposite to the direction of action of said first piston thereby causing the elastic deformation which said sleeve undergoes due to said first piston under the action of fluid pressure in said first-mentioned pressurizing chamber to be counterbalanced by the elastic deformation which said piezoelectric column undergoes due to said second piston under the action of fluid pressure in said second pressurizing chamber so that the lower end of said column is maintained at a constant distance with respect to said valve member regardless of a variation in the fluid pressure.

23. A piezoelectric hydraulic control valve according to claim 22, wherein said expansible sleeve has an axial length equal to that of said piezoelectric column and wherein said sleeve has a coefficient of linear expansion and a modulus of longitudinal elasticity equal to those of said column.

24. A piezoelectric hydraulic control valve according to claim 23, wherein the transversal cross-sectional areas of said column, said second piston, said sleeve, and said first piston have a correlation expressed by the equation $$S_2/S_1 = (S_4 - S_2)/S_3$$

wherein $S_1$ is the transversal cross-sectional area of said column, $S_2$ is the transversal cross-sectional area of said second piston, $S_3$ is the transversal cross-sectional area of said sleeve, and $S_4$ is the transversal cross-sectional area of said first piston.

* * * * *